United States Patent Office 3,703,540
Patented Nov. 21, 1972

3,703,540
PREPARATION OF O-ACYL-N-METHYLOL-AMIDES
Erwin Müller, Leverkusen, Germany, assignor to Farbenfabriken Bayer Aktiengesellschaft, Leverkusen, Germany
No Drawing. Filed Apr. 20, 1970, Ser. No. 30,262
Claims priority, application Germany, May 30, 1969,
P 19 27 642.7
Int. Cl. C07c 103/02, 103/60
U.S. Cl. 260—490
4 Claims

ABSTRACT OF THE DISCLOSURE

Preparation of the title products and corresponding urethanes by reacting (1) a compound containing at least one group of the formula

—CO—NR—CH$_2$—OR′ wherein R is hydrogen, alkyl, alkenyl, cycloalkyl or together with the free valency of the carbonyl groups represents —(CH$_2$)$_5$— and R′ is alkyl or alkenyl, is heated with (2) acetic anhydride or propionic anhydride at a temperature of from about 100 to about 170° C. Typical examples of (1) include N-methylol alkyl and alkenyl ethers of acrylamide and methacrylamide.

---

This invention relates to a process for the production of O-acyl-N-methylol-amides and O-acyl-N-methylol-urethanes from the corresponding N-methylol alkyl and N-methylol alkenyl ethers.

It is known that N-methylol carboxylic acid amides of unsaturated carboxylic acids can be reacted with carboxylic acid chlorides in the presence of pyridine to form the corresponding O-acyl derivatives (cf. Liebig, Annalen der Chemie, vol. 361 (1908), page 141).

It is also known from German Auslegeschrift No. 1,281,438 that N-methylol-acrylamide and N-methylol-methacrylamide can be converted into the corresponding acyl derivatives by reaction with acetic or propionic anhydride or with ketene or diketene at elevated temperatures of up to 100° C.

The present invention relates to a process for the production of O-acyl-N-methylol amides and O-acyl-N-methylol urethanes, wherein a compound containing at least one group of the formula

—CO—NR—CH$_2$—OR′ in which R represents hydrogen, alkyl, alkenyl, cycloalkyl or, together with the free valency of the carbonyl group, represents the alkylene group —(CH$_2$)$_5$—, and R′ represents alkyl or alkenyl, is heated with acetic anhydride or propionic anhydride at a temperature of from about 100 to 170° C.

In the above formula, the symbol R preferably represents hydrogen and the symbol R′ preferably represents alkyl with from 1 to 4 carbon atoms.

Advantageously, a compound containing the group

—CO—NH—CH$_2$OR in which R represents alkyl or alkenyl, is used in the process according to the invention.

Acrylamide and methacrylamide-N-methylol alkyl or alkenyl ethers, for example the methyl, ethyl, propyl, butyl and allyl ethers, are particularly preferred compounds containing the group —CO—NR—CH$_2$—OR′ at least once, which react according to the invention, to form the corresponding acetic acid and propionic acid esters, accompanied by small quantities of acetic acid and propionic acid. Caprolactam-N-methylol alkyl ethers, adipic acid diamide-bis-N-methylol-alkyl ethers, urethane-N-methylol alkyl ethers, and N-alkyl-urethane-N-methylol alkyl ethers, are further examples of compounds that can be reacted according to the invention.

The mechanism of the reaction according to the invention is illustrated with reference to the reaction of methacrylamide-N-methylol methyl ether and acetic anhydride indicated in the following formulae. O-acetyl-N-methylol methacrylamide is formed along with methyl acetate:

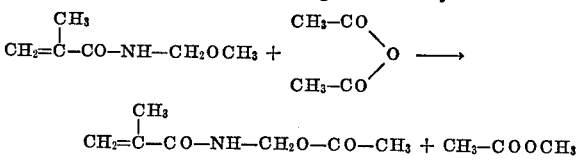

The reaction according to the invention can be carried out at a temperature of from 100 to 170° C. in the presence or absence of a transesterification catalyst or a solvent. Small quantities of a mineral acid such as hydrochloric acid or sulphuric acid, or an organic acid such as p-toluene sulphonic acid, or even an ester such as titanium tetrabutylate, may, for example, be used as transesterification catalysts. An excess of the particular acid anhydride used is preferably employed as solvent.

The reaction can also be carried out in the presence of a polymerisation inhibitor, such as pheno-thiazine, hydroquinone, di-tert, butyl-phenol-p-methylene methyl ether, or copper.

It was surprising that the process according to the invention should lead to the corresponding acylation products in high yields through a simple reaction. For one thing, it had been expected that the N-methylol groups would be split off and that secondary products would be formed at the reaction temperatures. Moreover, it is known that amides and urethane groups with a substitutable hydrogen atom can readily be acylated with carboxylic acid anhydrides.

The products obtained by the process according to the invention are valuable starting materials for further chemical reactions. In particular, the polymerisable derivatives can be converted into reactive copolymers.

EXAMPLE 1

A solution of 143 g. of methacrylamide-N-methylol ethyl ether (1 mol) and 204 g. of acetic anhydride (2 mols) is boiled under reflux for 8 hours, following the addition of 0.1 g. of phenothiazine. After 78 g. of ethyl acetate and excess acetic acid anhydride have been distilled off, the O-acetyl-N-methylol methacrylamide distills over at 94–100° C./0.2 mm. Yield 139 g. (88% by weight of the theoretical).

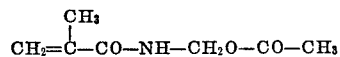

C$_7$H$_{11}$NO$_3$ (molecular weight 157): Calculated (percent by weight): C, 53.3; H, 7; O, 30.6; N, 9. Found (percent by weight): C, 53.5; H, 7.4; O, 30.5; N, 9.1.

EXAMPLE 2

A solution of 171 g. of methacrylamide-N-methylol butyl ether (1 mol) and 204 g. of acetic anhydride (2 mols) is boiled under reflux for 8 hours following the addition of 0.1 g. of phenothiazine. After a mixture of butyl acetate (B.P. 125° C./760 mm.), glacial acetic acid and acetic anhydride has been distilled off, the O-acetyl-N-methylol methacrylamide distills over at 94–100° C./ 0.2 mm. Yield 120 g. (76.5% by weight of the theoretical).

EXAMPLE 3

A solution of 129 g. of methacrylamide-N-methylol methyl ether (1 mol) and 204 g. of acetic anhydride is boiled under reflux for 8 hours following the addition of 0.1 g. of phenothiazine. After 70 g. of methyl acetate and excess acetic anhydride have been distilled off, the O-acetyl-N-methylol methacrylamide distills over at 94–100° C./0.9 mm. Yield 120 g. (76.5% by weight of the theoretical).

EXAMPLE 4

A solution of 157 g. of caprolactam-N-methylol methyl ether (1 mol) and 204 g. of acetic anhydride (2 mols) is boiled under reflux for 8 hours, following the addition of 6 drops of concentrated hydrochloric acid. After 74 g. of methyl acetate and excess acetic anhydride and a little glacial acetic acid have been distilled off, 158 g. of O-acetyl-N-methylol-caprolactam distill over at 98–103° C./0.1 mm.

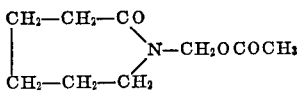

C₉H₁₅NO₃ (molecular weight 185): Calculated (percent by weight): C, 58.4; H, 8.1; O, 25.93; N, 7.57. Found (percent by weight): C, 58.9; H, 8.1; O, 25.3; N, 7.8.

EXAMPLE 5

A solution of 129 g. of methacrylamide-N-methylol methyl ether (1 mol) and 260 g. of propionic anhydride is boiled under reflux for 8 hours, following the addition of 0.1 g. of hydroquinone. After 65 g. of methyl propionate, excess propionic anhydride and a little propionic acid have been distilled off, O-propionyl-N-methylol methacrylamide distills over at 100–108° C./0.2 mm. Yield 105 g. (65% by weight of the theoretical).

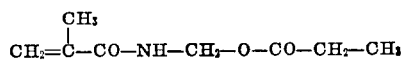

C₈H₁₃NO₃ (molecular weight 171): Calculated (percent by weight): C, 56.1; H, 7.6; O, 28.0; N, 8.2. Found (percent by weight): C, 55.9; H, 7.7; O, 28.3; N, 8.1.

EXAMPLE 6

A solution of 147 g. of N-methyl-ethyl urethane-N-methylol methyl ether (1 mol)

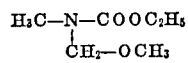

in 204 g. of acetic anhydride is boiled under reflux for 8 hours following the addition of 6 drops of concentrated hydrochloric acid. After 57 g. of methyl acetate and excess acetic anhydride have been distilled off, the N-methyl-O-acetyl-methylol ethyl urethane

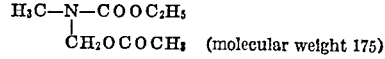

distills over at 107–117° C./12 mm. Yield 126 g. (72% of the theoretical).

Calculated (percent by weight): C, 48.0; H, 7.4; O, 36.6; N, 8.0. Found (percent by weight): C, 47.8; H, 7.2; O, 36.4; N, 8.1.

I claim:

1. A process for the production of O-acyl-N-methylolamides which comprises heating a N-methylol alkyl ether of acrylamide or methacrylamide with acetic anhydride or propionic anhydride at a temperature of from about 100 to about 170° C.

2. The process of claim 1 wherein the alkyl moiety of said ether has from 1 to 4 carbon atoms.

3. The process of claim 1 wherein said heating is carried out in the presence of a polymerization inhibiting amount of phenothiazine, hydroquinone, di-tert. butylphenol-p-methylene methyl ether or copper.

4. The process of claim 3 wherein said heating is carried out in the presence of a catalytic amount of p-toluene sulphonic acid, hydrochloric acid, sulphuric acid or titanium tetrabutylate.

References Cited

UNITED STATES PATENTS

| | | | |
|---|---|---|---|
| 2,545,093 | 3/1951 | Long et al. | 260—490 |
| 2,700,616 | 1/1955 | Fein et al. | 260—490 |
| 3,179,615 | 4/1965 | Magne et al. | 260—490 |

FOREIGN PATENTS

| | | | |
|---|---|---|---|
| 1,281,438 | 10/1968 | Germany | 260—496 |

VIVIAN GARNER, Primary Examiner

U.S. Cl. X.R.

260—239.3 A, 482 C